Patented Dec. 8, 1953

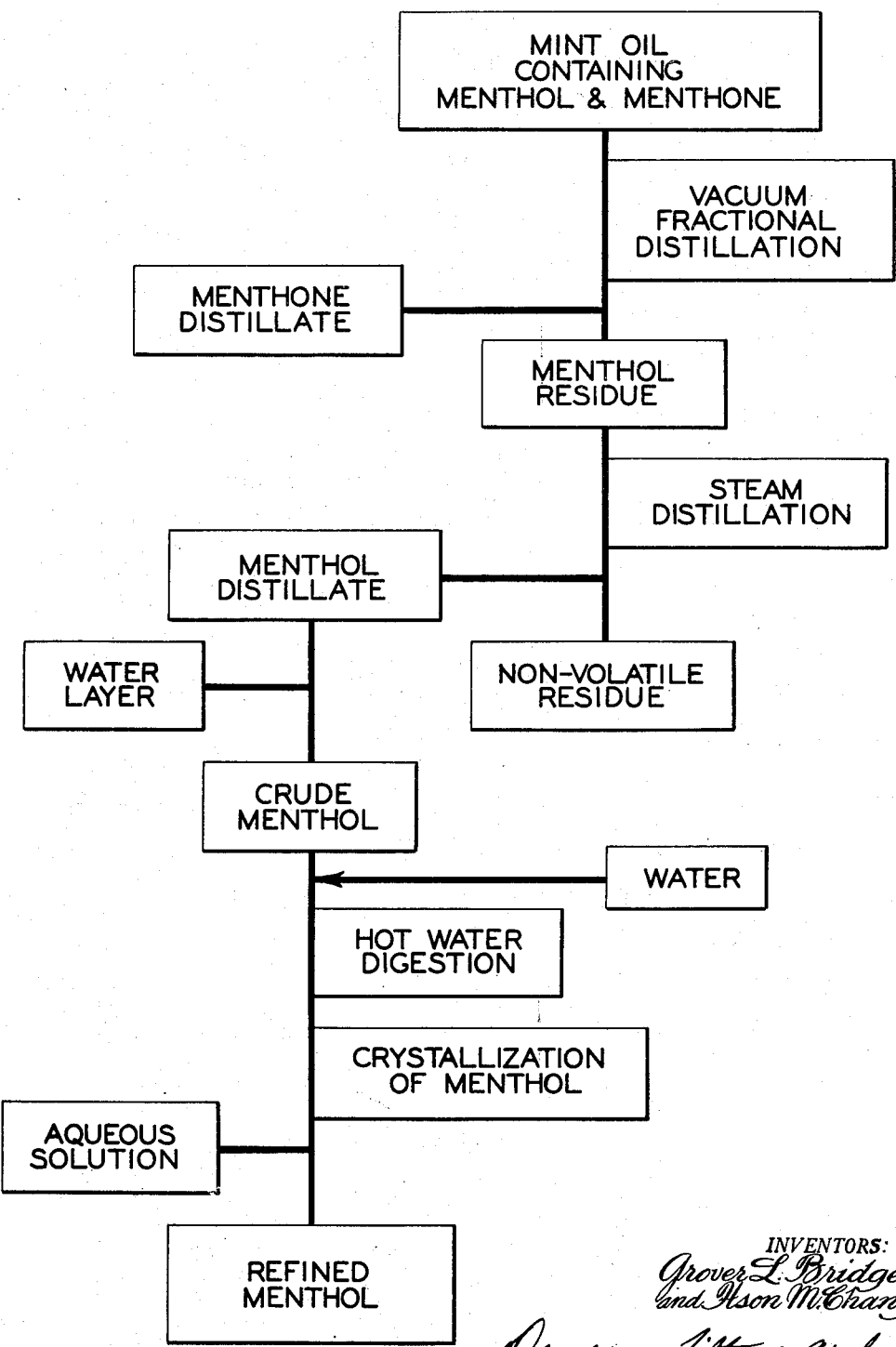

2,662,052

UNITED STATES PATENT OFFICE 2,662,052

SEPARATION OF MENTHOL FROM MINT OILS BY A FRACTIONAL DISTILLATION PROCESS

Grover L. Bridger, Ames, Iowa, and Hson M. Chang, Kowloon, Hong Kong, assignors to Iowa State College Research Foundation, Inc., Ames, Iowa, a corporation of Iowa Application July 24, 1951, Serial No. 238,398

5 Claims. (Cl. 202—46)

This invention relates to the preparation of menthol from mint oils. More particularly the invention relates to the extraction of natural menthol from mint oils by precise fractional distillation followed by purification of menthol.

There are two general types of mint oils produced by steam distillation of the peppermint plants: Mentha piperita, grown mainly in the United States and Europe, and Mentha arvensis, grown mainly in China, Japan, and Brazil. The oil produced from Mentha piperita is generally known as peppermint oil, while the oil produced from Mentha arvensis is usually designated as Chinese, Japanese, or Brazilian mint oil, according to its origin. The term "mint oils" will be used hereafter to include both types of oils containing a large amount of menthol.

Although the composition of mint oils is extremely complicated, the chief constituents may be classified as menthol, menthone, methyl esters, and terpene hydrocarbons. The oil from Mentha piperita usually contains 40% to 65% of menthol and 14% to 40% of menthone, while the oil from Mentha arvensis usually contains 60% to 85% of menthol and 12% to 20% of menthone. Menthol and menthone are the two compounds present in all mint oils in large quantities and, due to their similar physical properties, the separation of these two compounds is the chief problem in the production of menthol from mint oils.

The traditional method of producing menthol in China, Japan, and Brazil is to crystallize it from the mint oils at a temperature of about −10° C. The method consists of three steps; namely, formation of menthol crystals by freezing the natural mint oil, removal of the crystals from the residual oil by draining and centrifuging, and drying of the crystals. Since menthol is very soluble in other constituents in mint oil even at low temperatures, a large portion of menthol is retained in the residual oil. This so-called "dementholized mint oil" still contains about 50% of menthol and is sold mostly to Europe as a cheap substitute for peppermint oil at a price about 25% of that of U. S. Pharmacopoeia grade menthol crystals. It is evident that by this method, the yield of menthol is low and drops rapidly for a small decrease of the original menthol content in the mint oil and only oil containing more than 50% menthol can be used for the production of menthol. The free menthol content in American and European peppermint oil is usually below 50% and therefore cannot be used as raw materials for the production of menthol by mere crystallization.

Some Brazilian manufacturers have tried to convert menthone in the mint oil into menthol by reduction, thereby increasing the yield of menthol from the enriched oil. While the natural menthol from the traditional crystallization process is laevo active, the reduction of natural l-menthone in the mint oil yields, in addition to many undesirable side reaction products, several isomers of menthol, the separation of which is extremely difficult and expensive. The price of synthetic racemic menthol now on the market is only about two-thirds of that of natural l-menthol. Therefore, although the yield of menthol after reduction may be higher, the price of the isomeric product will be considerably lower, the overall result may be not economical. Evidently it is better not to try the reduction process until menthol has been separated from the mint oil as much as possible. If menthone can also be isolated first and then reduced, it is much easier to control the reduction, and higher yield of menthol may be expected.

Recently, efforts have been made at the Kitami factory in Japan toward a more complete recovery of menthol by first converting menthol into a non-volatile ester of boric acid, thus rendering the menthol readily separable from other volatile components. After removing the volatile components in the mint oil by steam distillation, the menthyl ester in the residue is saponified with caustic alkali and the regenerated menthol is obtained by steam distillation again. Starting from an average mint oil containing 75% of menthol, the yield by this process is illustrated as follows:

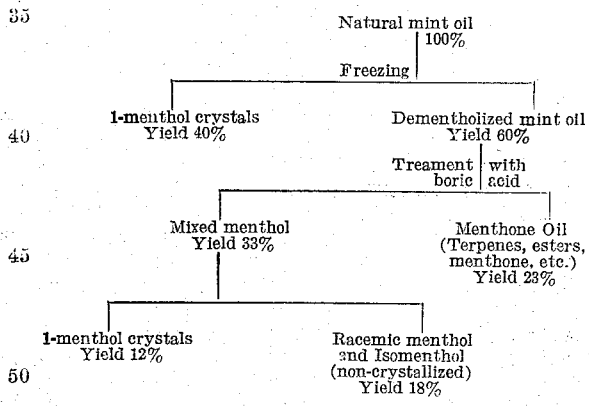

By this method the total yield of l-menthol crystals increased from 40% to 52% of the natural mint oil but due to inversion in process, part of the product could only be obtained as liquid isomeric menthol, the price of which should be even lower than that of synthetic racemic menthol. The "menthone oil" contains about 50% menthone, which is also racemized to a mixture of isomers, and is difficult to market.

An object of the present invention is to provide a process whereby the yield of menthol can be greatly increased over the yield under existing processes. Another object is to provide a simplified process whereby menthol can be effectively separated from menthone and a highly purified product obtained in large yield. Other specific objects and advantages will appear as the specification proceeds.

In one embodiment of our process, the menthone and lower boiling fractions are distilled off by precise fractionation, preferably under an absolute pressure of not over 50 mm. Hg and the menthol then separated from the non-volatile residue by steam distillation, the menthol being then purified, preferably by repeated digestion in boiling water until the melting-point of the product meets the U. S. Pharmacopoeia standards.

One embodiment of the process is shown in the drawing which outlines the steps of the process in diagrammatic form.

In spite of the small boiling point difference between menthol and menthone under atmospheric pressure, we have found that the differences in boiling point and the relative volatility of the two compounds are much greater at reduced pressure, and the two compounds can be separated from mint oil by precise fractional distillation. However, to produce menthol meeting U. S. P. standards by distillation only, it is necessary to have a very efficient fractionating column and an extremely large reflux ratio which is not easily realized in commercial operation. Although precise fractional distillation is commonly used in investigating the composition of essential oils, it has not been applied to the production of menthol from mint oils on a commercial scale. The following steps are, therefore, proposed so that less strict requirements on the precise fractionation can be tolerated:

(1) Distilling off menthone and lower boiling fractions in the mint oils by vacuum distillation in an efficient column;

(2) Separating methol from non-volatile components by steam distillation; and (3) Purifying menthol by digestion in water, crystallizing and drying.

The invention, in one aspect thereof, may be illustrated by the following example.

*Example 1*

A Chinese mint oil containing 65.2% menthol, 12.5% menthone, and 1.8% menthyl esters was fractionally distilled in a batch column having about 50 theoretical plates and using a reflux ratio of about 50 under an absolute pressure of 20 mm. Hg. The distillation was stopped as soon as most menthone and lower boiling fractions were distilled over. The residue, designated as menthone-free oil, solidified at room temperature and weighed about 70% of the original charge. It contained 89% free menthol and 6.5% non-volatile resins. This menthone-free oil was steam-distilled at atmospheric pressure until all volatile materials were distilled over. The condensate separated into two layers and on cooling, the menthol layer solidified to a crystalline mass. After desiccating, the menthol melted at 29° to 35° C., which was still far below the U. S. P. standard. The yield of this crude menthol was about 88% of the menthone-free oil charged to the still. This crude menthol was purified by digestion with water to remove the last traces of impurities. One hundred ml. of water were heated with about ten grams of crude menthol to boiling in a flask for 10 minutes. Vigorous shaking and stirring were necessary to keep the oily menthol layer in intimate contact with the water layer. On cooling, the menthol layer solidified and was separated from the solution. After desiccating, it melted at 38° to 40.5° C. The digestion process was repeated once again, using another 100 ml. of water. The melting point of the product rose to 41.6° to 42.7° C., which was within the U. S. P. specification. About 9.5 grams of pure product in the form of long needle-like crystals were obtained. The yield of U. S. P. menthol from the crude menthol was about 92%. The loss of menthol with impurities in the water solution, although inevitable, is small, as the solubility of menthol is only 0.42 gram per liter of solution at room temperature. The over-all yield of menthol was about 85% of the menthol contained in the mint oil.

Menthol obtained from this process remains levo-active and is chemically unaltered. The yield is materially higher than that obtainable from the traditional crystallization process.

While, in the foregoing specification, we have set forth specific steps in considerable detail for the purpose of illustrating embodiments of the invention, it will be understood that such steps may be varied widely by those skilled in the art without departing from the spirit of our invention.

We claim:

1. In a process for the separation of menthol from naturally-occurring mint oils containing menthol and menthone, the steps of distilling off menthone and lower boiling fractions under vacuum, steam distilling the unvaporized material to separate a menthol-containing fraction, and digesting the menthol-containing fraction in boiling water to purify the menthol.

2. The method of separation of menthol from naturally-occurring mint oils containing menthol and menthone which comprises distilling off menthone and lower boiling fractions by precise fractionation, under an absolute pressure of not over 50 mm. Hg, separating menthol from the non-volatile residue by steam distillation, and purifying the menthol to meet the U. S. P. specifications by repeated digestion in boiling water until the melting point of the product meets the U. S. P. standard.

3. In a process for the recovery of menthol from naturally-occurring mint oils containing menthol and menthone, the steps of distilling the mint oils under vacuum to remove menthone and lower boiling fractions, distilling with steam the non-vaporized material to recover a volatile fraction containing menthol, digesting the menthol fraction in boiling water, and cooling the water to crystallize the menthol.

4. In a process for separating menthol from naturally-occurring mint oils containing menthol and menthone, the steps of distilling off menthol and lower boiling fractions from mint oils by vacuum distillation, steam distilling the unvaporized material to recover a volatile fraction containing menthol, repeatedly digesting the menthol-containing fraction in hot water, cooling the material to crystallize the menthol, and drying the menthol product.

5. In a process for the separation of menthol from naturally-occurring mint oils containing menthol and menthone wherein said mint oils are subjected to vacuum distillation to remove a low boiling menthone-containing fraction while leaving an unvaporized residue containing menthol and various impurities, the steps of steam distilling the unvaporized residue to recover the menthol in the distillate, and then heat treating the menthol in a water bath while agitating said bath to keep the oily menthol layer in intimate contact with the water layer.

GROVER L. BRIDGER.
HSON M. CHANG.

References Cited in the file of this patent

Guenther, "The Essential Oils," published by the D. Van Nostrand Company, Inc., New York, New York. Vol. I (1948), pages 178, 187, 398, 399.

Brignall, "Determination of Menthol in Oil of Peppermint," Industrial and Engineering Chemistry, Analytical Edition, vol. 13, pages 166–168.

Guenther, "The Essential Oils," vol. II (1949), pages 224, 225, 390, 391; vol. III, pages 650, 651.

Sardonovsky, "Rectification of Peppermint Oil, Chemical Abstracts," vol. 25 (1930), page 4972.